(12) United States Patent
Izawa et al.

(10) Patent No.: US 6,921,788 B1
(45) Date of Patent: Jul. 26, 2005

(54) COATING MATERIAL FOR FORMING TRANSPARENT AND CONDUCTIVE FILM

(75) Inventors: Hajime Izawa, Funabashi (JP); Yuji Yamamoto, Funabashi (JP); Shin-ichi Tanaka, Funabashi (JP); Atsumi Wakabayashi, Funabashi (JP); Toru Motoki, Funabashi (JP); Hideki Horikoshi, Funabashi (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 143 days.

(21) Appl. No.: 09/869,724

(22) PCT Filed: Oct. 23, 2000

(86) PCT No.: PCT/JP00/07379

§ 371 (c)(1),
(2), (4) Date: Jun. 29, 2001

(87) PCT Pub. No.: WO01/32792

PCT Pub. Date: May 10, 2001

(30) Foreign Application Priority Data

Oct. 29, 1999 (JP) ............................................. 11-310172

(51) Int. Cl.$^7$ ............................. C08K 3/22; C08K 9/00; H01B 1/08
(52) U.S. Cl. .................. 524/430; 523/200; 252/519.33; 252/520.1; 428/328; 428/689
(58) Field of Search ........................ 524/430; 523/200; 252/519.33, 520.1; 428/328, 689

(56) References Cited

U.S. PATENT DOCUMENTS

| | | | |
|---|---|---|---|
| 5,204,177 A | | 4/1993 | Sato et al. .................. 428/328 |
| 5,411,792 A | * | 5/1995 | Yukinobu et al. |
| 5,504,133 A | | 4/1996 | Murouchi et al. .......... 524/430 |
| 5,518,810 A | | 5/1996 | Nishihara et al. ........... 428/328 |
| 6,261,479 B1 | * | 7/2001 | Yukinobu et al. |
| 2002/0051879 A1 | * | 5/2002 | Tamai et al. |

FOREIGN PATENT DOCUMENTS

| | | |
|---|---|---|
| EP | 1022587 A1 | 7/2000 |
| EP | 1 057 621 A1 | 12/2000 |
| JP | 5-331386 | 12/1993 |
| JP | 6-49394 | 9/1994 |
| JP | 7-70481 | 3/1995 |
| JP | 7-310033 | 11/1995 |
| JP | 8-10227 | 4/1996 |
| JP | 6-165147 | 6/1996 |
| JP | 8-143792 | 6/1996 |
| JP | 9-221558 | 8/1997 |
| JP | 11-6902 | 1/1999 |
| JP | 11-153703 | 6/1999 |
| JP | 11-218604 | 8/1999 |
| KR | 10-0214428 | 1/1995 |
| WO | WO98/45734 | 10/1998 |
| WO | WO 01/32792 A1 | 5/2001 |

* cited by examiner

Primary Examiner—Tae H. Yoon
(74) Attorney, Agent, or Firm—Sierra Patent Group, Ltd.

(57) ABSTRACT

The present invention relates to a paint for forming a transparent conductive thin film characterized in comprising at least a conductive oxide powder comprising a primary granular diameter of no greater than 100 nm; an easily dispersible low-boiling point solvent of the aforementioned conductive oxide powder; a difficultly dispersible high-boiling point solvent of the aforementioned conductive oxide powder; and a binder. By using the paint for forming a transparent conductive thin film, it is possible to form a transparent conductive thin film having superior transparency and conductive properties onto the surface of a transparent material. The present invention also provides a paint for forming a transparent conductive thin film which is useful as a coating for transparent material surfaces that require the effects of blocking static electricity, interfering with electromagnetic waves, and the like, such as screen surfaces for display devices, surface covering materials of the same, window glass, show window glass, covering materials for instruments, materials for "clean room" floors and walls, packaging materials for semiconductors, and the like; and a transparent conductive thin film obtained by means of coating the aforementioned paint as a transparent thin film.

11 Claims, 1 Drawing Sheet

COATING MATERIAL FOR FORMING TRANSPARENT AND CONDUCTIVE FILM

TECHNICAL FIELD

The present invention relates to a paint for forming a transparent conductive thin film and a transparent conductive thin film. More specifically, the present invention relates to a paint for forming a transparent conductive thin film which is useful as a coating for transparent material surfaces that require the effects of blocking static electricity, interfering with electromagnetic waves, and the like, such as screen surfaces for display devices, surface covering materials of the same, window glass, show window glass, covering materials for instruments, material for "clean room" floors and walls, packaging materials for semiconductors, and the like; and a transparent conductive thin film obtained by means of coating the aforementioned paint as a transparent thin film.

The present application is based on the corresponding patent application filed in Japan (Japanese Patent Application No. Hei 11-310172); the contents of this Japanese Patent Application are incorporated in part into the present application.

BACKGROUND ART

In general, transparent substrates such as glass substrates used for image display members of CRT display apparatuses, plastic substrates for used as material for "clean room" floors and walls, and the like require treatment for static electricity prevention in order to prevent static electricity blockade. In particular, a conductive thin film to be treated for static electricity prevention is formed onto the surfaces of optical parts such as image display members of CRT display apparatuses, liquid crystal image display members, covering materials for instruments and the like. In order to impart the aforementioned static electricity preventing function without losing the color tone of these optical parts, the aforementioned conductive thin film must comprise a high transparency having a total light permeability of at least 80% and a haze value of no greater than 5%, and a conductivity having a surface resistivity of no greater than $9 \times 10^{11}$ $\Omega/\square$.

As a treatment method for static electricity prevention, a method is known in which a transparent thin film having conductive properties is formed onto the surface of a transparent substrate such as glass or the like. As the material for forming this type of transparent conductive thin film, a paint for forming a transparent conductive thin film is used which comprises an antimony-doped tin oxide powder having a primary granular diameter of 1~100 nm, a binder, and a solvent.

According to this conventional method, it is possible to form a thin film having conductive properties stably. However, according to this conventional method, it is extremely difficult to form a thin film having a superior transparency with a total light permeability of at least 80% and a haze value of no greater than 5%. In particular, a transparent conductive thin film formed in accordance with the conventional method does not comprise a sufficient transparency, as a conductive thin film for preventing static electricity, when formed onto the surface of the aforementioned optical parts.

In order to solve the aforementioned problems, the present invention provides a paint which is effective in forming a transparent conductive thin film onto the surface of a transparent material, said transparent conductive thin film possessing a superior transparency and, moreover, a conductivity equal to or greater than that of the conventional transparent conductive thin film, despite the addition of only a small amount of the conductive component; and a transparent conductive thin film formed by means of using the aforementioned paint.

DISCLOSURE OF INVENTION

In order to solve the aforementioned problems, the present invention based on claim 1 provides a paint for forming a transparent conductive thin film characterized in comprising at least: a conductive oxide powder comprising a primary granular diameter of no greater than 100 nm; an easily dispersible low-boiling point solvent of said conductive oxide powder; a difficultly dispersible high-boiling point solvent of said conductive oxide powder; and a binder.

In addition, the present invention based on claim 2 provides a paint for forming a transparent conductive thin film, wherein said conductive oxide powder is selected from among a tin oxide powder, an antimony-doped tin oxide powder, an indium oxide powder, and a tin-doped indium oxide powder.

Furthermore, the present invention based on claim 3 provides a paint for forming a transparent conductive thin film, wherein said conductive oxide powder comprises a primary granular diameter of 1~10 nm, and a secondary granular diameter of 20~150 nm.

In addition, the present invention based on claim 4 provides a transparent conductive thin film characterized in having at least one layer comprising a transparent conductive layer which possesses mesh-shaped openings and is formed by means of using said paint for forming a transparent conductive thin film.

In addition, the present invention based on claim 5 provides a transparent conductive thin film comprising a high transparency having a total light permeability of at least 80% and a haze value of no greater than 5%, and a high conductivity having a surface resistivity of no greater than $9 \times 10^{11}$ $\Omega/\square$.

BEST MODE FOR CARRYING OUT THE INVENTION

Figure 1:
FIG. 1 is a TEM photograph showing an enlargement of the transparent conductive thin film according to the present invention.

In the following, the present invention will be further described by means of the preferred embodiments. Furthermore, the preferred embodiments are for the purpose of more effectively explaining the present invention, and hence the present invention is not particularly limited thereto.

[Paint for Forming a Transparent Conductive Thin Film]

The paint for forming a transparent conductive thin film according to the present embodiment comprises at least: a conductive oxide powder comprising a primary granular diameter of no greater than 100 nm; an easily dispersible low-boiling point solvent of said conductive oxide powder; a difficultly dispersible high-boiling point solvent of said conductive oxide powder; and a binder dissolved in the two aforementioned types of solvents.

Among the two or more types of solvents contained in the paint for forming a transparent conductive thin film, the term "easily dispersible" solvent refers to the solvent which disperse the conductive oxide powder more easily than the other solvent(s). On the other hand, among the two or more types of solvents contained in the paint for forming a transparent conductive thin film, the term "difficultly dispersible" solvent refers to the solvent which disperse the conductive oxide powder more difficultly than the other solvent(s).

In addition, among the two or more types of solvents contained in the paint for forming a transparent conductive thin film, the term "low-boiling point" solvent refers to the solvent which has the lower boiling point than the other solvent(s). And, among the two or more types of solvents contained in the paint for forming a transparent conductive thin film, the term "high-boiling point" solvent refers to the solvent which has the higher boiling point than the other solvent(s). Furthermore, with regard to the "low-boiling point" solvent and "high-boiling point" solvent, a temperature difference of at least 30° C. is preferred.

The conductive oxide powder is not particularly limited, as long as it possesses both a superior transparency and conductivity, in addition to a primary granular diameter of no greater than 100 nm. Appropriate examples of this conductive oxide powder include a tin oxide powder, an antimony-doped tin oxide (hereinafter referred to as "ATO") powder, an indium oxide powder, and a tin-doped indium oxide powder. Among the aforementioned, from the perspective of transparency and conductivity, in particular, the ATO powder may be appropriately used.

In addition, the conductive oxide powder preferably comprises a primary granular diameter of 1~10 nm, and a secondary granular diameter of 20~150 nm. In the case when using a conductive oxide powder comprising a primary granular diameter and secondary granular diameter within the aforementioned ranges, a transparent conductive thin film having both a superior transparency and conductivity can be easily formed.

In other words, when the primary granular diameter is less than 1 nm, the contact resistivity increases due to an increase in the number of contact points among the primary granules. As a result, the conductivity of the aforementioned paint decreases, and the granules tend to aggregate easily, such that formation of secondary granules, in the aforementioned paint, having diameters within the aforementioned range is not possible. In addition, a primary granular diameter exceeding 10 nm results in degradation of the transparency of the resultant conductive thin film, such that obtaining a transparency with a total light permeability of at least 80% and a haze value of no greater than 5% becomes difficult.

The conductive oxide powder may also undergo various surface processing, for example, hydrophilic processing or non-hydrophilic processing, wherein the combination of solvents used must be appropriately selected, as described below, depending on the surface treatment conditions.

The concrete examples of the "easily dispersible low-boiling point solvent of the conductive oxide powder" differ depending on the surface conditions of the conductive oxide powder to be used.

In other words, when the conductive oxide powder to be used comprises a hydrophilic powder, examples of the easily dispersible low-boiling point solvent of the conductive oxide powder may include water (boiling point 100° C.), methanol (boiling point 65° C.), ethanol (boiling point 78° C.), 2-propanol (boiling point 82° C.), 1-propanol (boiling point 97° C.), and the like.

In addition, when the conductive oxide powder to be used comprises a non-hydrophilic powder, examples of the easily dispersible low-boiling point solvent of the conductive oxide powder may include acetone (boiling point 56° C.), methylethyl ketone (boiling point 80° C.), methylisobutyl ketone (boiling point 116° C.), diethyl ketone (boiling point 102° C.), tetrahydrofuran (boiling point 66° C.), methyl formate (boiling point 32° C.), ethyl formate (boiling point 54° C.), methyl acetate (boiling point 58° C.), ethyl acetate (boiling point 77° C.), and the like.

The concrete examples of the "difficultly dispersible high-boiling point solvent of the conductive oxide powder" also differ depending on the surface conditions of the conductive oxide powder to be used.

In other words, when the conductive oxide powder to be used comprises a hydrophilic powder, examples of the difficultly dispersible high-boiling point solvent of the conductive oxide powder may include 1-ethoxy-2-propanol (boiling point 132° C.), 1-methoxy-2-propanol (boiling point 120° C.), 2-methoxyethyl acetate (boiling point 145° C.), 2-ethoxyethyl acetate (boiling point 156° C.), 2-butoxyethyl acetate (boiling point 191° C.), tetrahydrofurfuryl alcohol (boiling point 178° C.), propylene carbonate (boiling point 242° C.), N,N-dimethyl formamide (boiling point 153° C.), N-methylformamide (boiling point 180° C.), N-methylpyrrolidone (boiling point 202° C.), 2-ethoxy ethanol (boiling point 136° C.), 2-butoxy ethanol (boiling point 170° C.) and the like.

In addition, when the conductive oxide powder to be used comprises a non-hydrophilic powder, examples of the difficultly dispersible high-boiling point solvent of the conductive oxide powder may include toluene (boiling point 110° C.), xylene (boiling point 138~144° C.), ethyl benzene (boiling point 136° C.), isophorone (boiling point 215° C.), cyclohexanone (boiling point 156° C.), 2-ethoxy ethanol (boiling point 136° C.), 2-butoxy ethanol (boiling point 170° C.), and the like.

The aforementioned binder is not particularly limited and may comprise any binder which is soluble in the aforementioned two or more types of solvents, as long as a thin film possessing a superior durability is obtainable. Examples of this binder may include acrylic resins such as methacrylic resins and the like, polyacetylene resins, amino resins such as melamine resins and the like, polyamide resins, polyimide resins, polyamide-imide resins, polyethylene resins, polycarbonate resins, polyurethane resins, polyester resins such as alkyd resins and the like, epoxy resins, polystyrene resins, ABS resins, polyamicsulfone resins, polyethersulfone resins, vinyl chloride resins, vinylidene chloride resins, vinyl acetate resins, polyvinyl alcohol resins, silicone resins, fluorine resins, polyphenylene oxide resins, polypyrrole resins, ultraviolet ray cure resins, cellulose derivatives such as diacetyl celluose, triacetyl celluose and the like. The aforementioned binders may be used alone or in combinations of two or more.

The blending ratios of each component in the paint for forming a transparent conductive thin film is not particularly limited, but may comprise, for example, 0.6~12% by weight of the conductive oxide powder granules, 1~25% by weight of the binder, with the remainder comprising at least two type of solvents.

When using a paint for forming a transparent conductive thin film having the aforementioned blending ratios, it is possible to easily obtain a transparent conductive thin film comprising a surface resistivity of no greater than $9\times10^{11}$ $\Omega/\square$, a total light permeability of at least 80%, and a haze value of no greater than 5%. In particular, in the case when ATO powder is used as the conductive oxide powder, it is possible to easily obtain a transparent conductive thin film comprising a surface resistivity of $1\times10^6 \sim 9\times10^{11}$ $\Omega/\square$, a total light permeability of at least 85%, and a haze value of no greater than 0.5%.

In addition, among the two or more types of solvents, the blending ratio of the "easily dispersible low-boiling point solvent of said conductive oxide powder" and "difficultly dispersible high-boiling point solvent of said conductive oxide powder" comprises a weight ratio of 95:5~60:40. This weight ratio allows for the easy formation of a conductive oxide powder, within the aforementioned paint, comprising secondary granules having a granular diameter of 20~150 nm, and results in a superior conductivity and tranparency, in addition to a superior paint dispersion stability and easy coating properties.

In addition, the paint for forming a transparent conductive thin film according to the present embodiment may be prepared from a conductive oxide powder, an easily dispersible low-boiling point solvent of said conductive oxide powder, a difficultly dispersible high-boiling point solvent of said conductive oxide powder, and a binder, in addition to adding and mixing in, as necessary, additives such as a dispersing agent, viscosity controlling agent, surface improving agent, and the like according to the appropriate conventional method.

At the same time, it is also possible to appropriately add a third solvent in addition to the easily dispersible low-boiling point solvent of said conductive oxide powder, and difficultly dispersible high-boiling point solvent of said conductive oxide powder.

[Transparent Conductive Thin Film]

A transparent conductive thin film having mesh-shaped openings is obtained by means of coating the aforementioned paint for forming a transparent conductive thin film onto a substrate surface such as glass, plastic or the like, and then drying, curing, and forming a thin film onto the substrate surface.

Here, any conventional method may be used to coat the paint for forming a transparent conductive thin film onto the surface of the substrate: for example, spin coating, dip coating, spray coating, flow coating, bar coating, gravure coating, or the like may be used. The drying temperature is not in particular limited, as long as the temperature allows for the evaporation of the solvents used.

It is not always clear why a transparent conductive thin film having both a superior transparency and conductivity is formed using the paint for forming a transparent conductive thin film, however, a hypothesis for the aforementioned is described below. In other words, when the film coat formed using the paint for forming a transparent conductive thin film is dried, the easily dispersible low-boiling point solvent of said conductive oxide powder is evaporated off, which in turn results in the gentle aggregation of the conductive oxide powder into a mesh form. This aggregate, while maintaining the aforementioned mesh structure, is then solidified onto the substrate via the binder with the evaporation of the difficultly dispersible high-boiling point solvent of said conductive oxide powder to form the transparent conductive thin film having mesh-shaped openings, as shown in FIG. 1 (TEM photograph, 500,000× enlargement).

As a result, despite adding only a small amount of the conductive component, it is possible to form an excellent conductive pass, and moreover, achieve an excellent transparency by means of the mesh-shaped openings.

EXAMPLES

In the following, the present invention will be further described by means of the Examples.

Experimental Example

As the conductive oxide powder, 0.01 g of an ATO powder (non-hydrophilic, manufactured by Sumitomo Osaka Cement, Inc.) comprising a primary granular diameter of 3~8 nm, was respectively dispersed into 5.0 g of methylethyl ketone, diacetone alcohol, cyclohexanone, and toluene as the solvents. The secondary granular diameters of the ATO powder in these dispersed solvents were then measured using a laser diffraction method, and the dispersibility of the ATO powder was evaluated. These results are shown in Table 1.

Example 1

0.20 g of the ATO powder used in the Experimental Example above, 17.00 g of methylethyl ketone, 2.00 g of cyclohexanone and 0.80 g of a polyester resin (brand name Eliter, manufactured by Yunichika, K.K.) were mixed together as the conductive oxide powder, easily dispersible low-boiling point solvent of said ATO powder, difficultly dispersible high-boiling point solvent of said ATO powder, and binder, respectively. The mixture was then dispersed using an ultrasound dispersing device to yield a paint for forming a transparent conductive thin film of Example 1.

The secondary granular diameters of the ATO powder within the transparent conductive paint were then measured using a laser diffraction method (PHOTON CORRELATOR LPA-3000 manufactured by Otsuka Electron, Inc.). These results are shown in Table 2.

The paint for forming the transparent conductive thin film of Example 1 was then coated onto a polyethylene terephthalate film at room temperature using a bar coater (#7), and dried for 10 minutes under a temperature of 100° C. to form the transparent conductive thin film.

Subsequently, the total light permeability, haze value, and surface resistivity of the resultant transparent conductive thin film were each measured by the following methods and devices. These results are shown in Table 2.

Total light permeability: HAZE METER MODEL TC-H3DPK manufactured by Tokyo Denshoku, K.K.

Haze value: Same as above

Surface resistivity: Loresta IP manufactured by Mitsubishi Chemicals, Inc.

In addition, the film structure of this transparent conductive thin film was observed under an electron microscope to verify the formation of a plurality of mesh-shaped openings.

Example 2

A paint for forming the transparent conductive thin film of Example 2 was prepared in the same manner as Example 1, with the exception of the blending amounts of the ATO powder, methylethyl ketone, cyclohexanone and binder, which were 2.4 g, 12.00 g, 2.00 g, and 3.60 g, respectively.

The secondary granular diameters of the ATO powder within the transparent conductive paint were then measured in the same manner as in Example 1. These results are shown in Table 2.

In the same manner as in Example 1, a transparent conductive thin film was then formed from the above paint for forming the transparent conductive thin film of Example 2. Subsequently, the total light permeability, haze value, and surface resistivity of the resultant transparent conductive thin film were each measured in the same manner as in Example 1. These results are shown in Table 2.

In addition, the film structure of this transparent conductive thin film was observed under an electron microscope to verify the formation of a plurality of mesh-shaped openings.

Example 3

A paint for forming the transparent conductive thin film of Example 3 was prepared in the same manner as Example 1, with the exception of the blending amounts of methylethyl ketone and cyclohexanone which were 13.00 g and 6.00 g, respectively.

The secondary granular diameters of the ATO powder within the transparent conductive paint were then measured in the same manner as in Example 1. These results are shown in Table 2.

In the same manner as in Example 1, a transparent conductive thin film was then formed from the above paint for forming the transparent conductive thin film of Example 3. Subsequently, the total light permeability, haze value, and surface resistivity of the resultant transparent conductive thin film were each measured in the same manner as in Example 1. These results are shown in Table 2.

In addition, the film structure of this transparent conductive thin film was observed under an electron microscope to verify the formation of a plurality of mesh-shaped openings.

Comparative Example 1

The paint for forming the transparent conductive thin film of Comparative Example 1 was prepared in the same manner as Example 1, with the exception that only 19.00 g of methylethyl ketone was used as the solvent.

The secondary granular diameters of the ATO powder within the transparent conductive paint were then measured in the same manner as in Example 1. These results are shown in Table 2.

In the same manner as in Example 1, a transparent conductive thin film was then formed from the above paint for forming the transparent conductive thin film of Comparative Example 1. Subsequently, the total light permeability, haze value, and surface resistivity of the resultant transparent conductive thin film were each measured in the same manner as in Example 1. These results are shown in Table 2.

In addition, upon viewing the film structure of this transparent conductive thin film under an electron microscope, there was no formation of any mesh-shaped openings.

Comparative Example 2

An attempt was made to prepare the paint for forming the transparent conductive thin film of Comparative Example 2 in the same manner as Example 1, with the exception that only 19.00 g of cyclohexanone was used as the solvent. However, precipitates of ATO aggregates formed, such that coating was not possible.

TABLE 1

| Solvent Name | Boiling point (° C.) | Secondary granular diameter (nm) | ATO dispersibility |
|---|---|---|---|
| Methylethyl ketone | 79.64 | 51 | Excellent |
| Diacetone alcohol | 168.10 | 40 | Excellent |
| Cyclohexanone | 155.65 | — | Poor (precipitation) |
| Toluene | 110.63 | — | Poor (precipitation) |

TABLE 2

| | Secondary granular diameter (nm) | Total light permeability (%) | Haze value (%) | Surface resistivity (Ω/) |
|---|---|---|---|---|
| Example 1 | 113 | 95.3 | 0.2 | $2.7 \times 10^{10}$~$6.5 \times 10^{10}$ |
| Example 2 | 133 | 87.1 | 0.4 | $3.8 \times 10^{8}$~$5.7 \times 10^{8}$ |
| Example 3 | 130 | 92.8 | 0.3 | $1.1 \times 10^{10}$~$3.3 \times 10^{10}$ |
| Comparative Example 1 | 98 | 95.5 | 0.2 | $8.8 \times 10^{12}$~$22 \times 10^{12}$ |
| Comparative Example 2 | — | — | — | — |

Note: In Examples 1~3, due to the inclusion of a binder in the paint, the secondary granular diameters were larger than the secondary granular diameters of the Experimental Example.

INDUSTRIAL APPLICABILITY

According to the paint for forming a transparent conductive thin film based on Clam 1, which is characterized in comprising at least a conductive oxide powder comprising a primary granular diameter of no greater than 100 nm, an easily dispersible low-boiling point solvent of said conductive oxide powder, a difficultly dispersible high-boiling point solvent of said conductive oxide powder, and a binder, it is possible to obtain a paint for forming a transparent conductive thin film by means of which a transparent conductive thin film possessing a superior conductivity and transparency may be formed despite the addition of only a small amount of the conductive component.

According to the paint for forming a transparent conductive thin film based on Clam 2, wherein said conductive oxide powder is selected from among a tin oxide powder, an antimony-doped tin oxide powder, an indium oxide powder, and a tin-doped indium oxide powder, it is possible to impart both a superior transparency and conductivity.

According to the paint for forming a transparent conductive thin film based on Clam 3, it is possible to impart both a superior transparency and conductivity since the conductive oxide powder comprises a primary granular diameter of 1~10 nm, and a secondary granular diameter of 20~150 nm.

In addition, according to the transparent conductive thin film based on Clam 4, by means of incorporating at least one layer comprising a transparent conductive layer which possesses mesh-shaped openings and is formed by means of using said paint for forming a transparent conductive thin film based on Clam 1, it is possible to form an excellent conductive pass despite the addition of only a small amount of the conductive component, and obtain an excellent transparency from the mesh-shaped openings.

In this manner, by means of coating, drying and curing the paint for forming a transparent conductive thin film based on Clam 1 onto the surface of a substrate, such as glass, plastic or the like, it is possible to form a superior transparent conductive thin film comprising a plurality of mesh-shaped openings, which has transparency of a total light permeability of at least 80% and a haze value of no greater than 5%, and a surface resistivity of no greater than $9 \times 10^{11}$ Ω/□.

Consequently, it is possible to form a transparent conductive thin film which is useful as a coating for transparent material surfaces that require the effects of blocking static electricity, interfering with electromagnetic waves, and the like, such as screen surfaces for display devices, surface covering materials of the same, window glass, show window glass, covering materials for instruments, material for "clean room" floors and walls, packaging materials for semiconductors, and the like, and thus also broaden the spectrum of use for such transparent conductive thin films.

The transparent conductive thin film based on claim 5 comprises a total light permeability of at least 80%, a haze value of no greater than 5%, and a surface resistivity of no greater than $9 \times 10^{11}$ Ω/□, and as a result, it is possible to obtain a film having both a high conductivity and a high transparency.

Furthermore, the present invention has been described by means of the claims, but is in no manner limited to just the contents of the present description. In addition, the present invention also includes modifications and changes based on the claims of the present invention.

What is claimed is:

1. A paint for forming a transparent conductive film comprising:
    a conductive oxide powder having a primary particle diameter of no greater than 100 nm, an easily dispersible low-boiling point solvent of said conductive oxide powder, a difficulty dispersible high-boiling point solvent of said conductive oxide powder, and a binder, wherein said conductive oxide powder is a hydrophilic powder, wherein the easily dispersible low-boiling point solvent is selected from the group consisting of water, methanol, ethanol, 2-propanol, and 1-propanol, wherein the difficultly dispersible high-boiling point solvent is selected from the group consisting of 1-ethoxy-2-propanol, 1-methoxy-2-propanol, 2-methoxyethyl acetate, 2-ethoxyethyl acetate, 2-butoxyethyl acetate, tetrahydrofurfuryl alcohol, propylene carbonate, N,N-dimethyl formamide, N-methylformamide, N-methylpyrrolidone, 2-ethoxy ethanol, and 2-butoxy ethanol, wherein a temperature difference between a boiling point of said easily dispersible low-boiling point solvent and a boiling point of said difficultly dispersible high-boiling point solvent is 30 degrees Celsius or greater, and wherein a blending weight ratio of said easily dispersible low-boiling point solvent and said difficultly dispersible high-boiling point solvent is in a range of 95:5 to 60:40.

2. The paint for forming a transparent conductive film according to claim 1, wherein said conductive oxide powder is selected from among a tin oxide powder, an antimony-doped tin oxide powder, an indium oxide powder, and a tin-doped indium oxide powder.

3. The paint for forming a transparent conductive film according to claim 1, wherein said conductive oxide powder has a primary particle diameter of 1 nm to 10 nm, and a secondary particle diameter of 20 nm to 150 nm.

4. A transparent conductive film comprising:
    at least one layer comprising a transparent conductive layer which possesses mesh-shaped openings and is formed by means of using said paint for forming a transparent conductive film according to claim 1.

5. The transparent conductive film according to claim 4, comprising:
    a total light permeability of at least 80%, a haze value of no greater than 5%, and a surface resistivity of no greater than $9 \times 10^{11}$ Ω/□.

6. The paint for forming a transparent conductive film according to claim 1, wherein said conductive oxide powder has a secondary particle diameter of 20 nm to 150 nm.

7. A paint for forming a transparent conductive film comprising:
    a conductive oxide powder having a primary particle diameter of no greater than 100 nm;
    an easily dispersible low-boiling point solvent of said conductive oxide powder;
    a difficultly dispersible high-boiling point solvent of said conductive oxide powder; and
    a binder;
    wherein said conductive oxide powder is a non-hydrophilic powder;
    wherein the easily dispersible low-boiling point solvent is selected from the group consisting of acetone, methylethyl ketone, methylisobutyl ketone, diethyl ketone, tetrahydrofuran, methyl formate, ethyl formate, methyl acetate, and ethyl acetate;
    wherein the difficultly dispersible high-boiling point solvent is selected from the group consisting of toluene, xylene, ethyl benzene, isophorone, cyclohexanone, 2-ethoxy ethanol, and 2-butoxy ethanol;
    wherein a temperature difference between a boiling point of said easily dispersible low-boiling point solvent and a boiling point of said difficultly dispersible high-boiling point solvent is 30 degrees Celsius or greater;
    wherein a blending weight ratio of said easily dispersible low-boiling point solvent and said difficultly dispersible high-boiling point solvent is in a range of 95:5 to 60:40; and
    wherein said conductive oxide powder has a primary particle diameter of 1 nm to 10 nm, and a secondary particle diameter of 20 nm to 150 nm.

8. The paint for forming a transparent conductive film according to claim 7, wherein said conductive oxide powder is selected from among a tin oxide powder, an antimony-doped tin oxide powder, an indium oxide powder, and a tin-doped indium oxide powder.

9. A transparent conductive film comprising:
    at least one layer comprising a transparent conductive layer which possesses mesh-shaped openings and is formed by means of using said paint for forming a transparent conductive film according to claim 7.

10. The transparent conductive film according to claim 9, comprising:
    a total light permeability of at least 80%, a haze value of no greater than 5%, and a surface resistivity of no greater than $9 \times 10^{11}$ Ω/□.

11. The paint for forming a transparent conductive film according to claim 7, wherein said conductive oxide powder has a secondary particle diameter of 20 nm to 150 nm.

\* \* \* \* \*